May 18, 1926.

O. GRUENBERGER

ELECTRICAL CONDENSER

Filed Dec. 29, 1922

1,584,923

Inventor:
Otto Gruenberger
by George M. Albrecht
Attorney

Patented May 18, 1926.

1,584,923

UNITED STATES PATENT OFFICE.

OTTO GRUENBERGER, OF WAUWATOSA, WISCONSIN.

ELECTRICAL CONDENSER.

Application filed December 29, 1922. Serial No. 609,644.

This invention relates to electrical condensers, and more particularly to those in which the capacity may be varied. One of the objects of the invention is the provision of a variable condenser of comparatively small size and large capacity. Another object is the provision of an efficient variable condenser of any desired value of capacity within a wide range, such for example, as may be employed in radio communication, or for various other uses not necessary to be enumerated to those skilled in the art, which may be cheaply manufactured. A further object is the provision of a variable condenser in which small variations in capacity may be secured, and more particularly such variations through a wide range of capacity covering substantially the entire capacity of the condenser, which may be at the same time cheaply manufactured. A still further object is the provision of a variable condenser having relatively movable conducting elements, in which flexible leads, wiping or sliding contacts and the like, may be dispensed with, whereby the electrical characteristics of the condenser are maintained constant, and it is more efficient generally. Other objects will appear hereinafter as the description of the invention proceeds.

The novel features of the invention will appear from this specification and the accompanying drawings forming a part thereof and showing several embodiments of the invention, and all these novel features are intended to be set forth in the claims.

In the drawings, Fig. 1 is a side elevation of a condenser embodying the invention;

Figure 1:
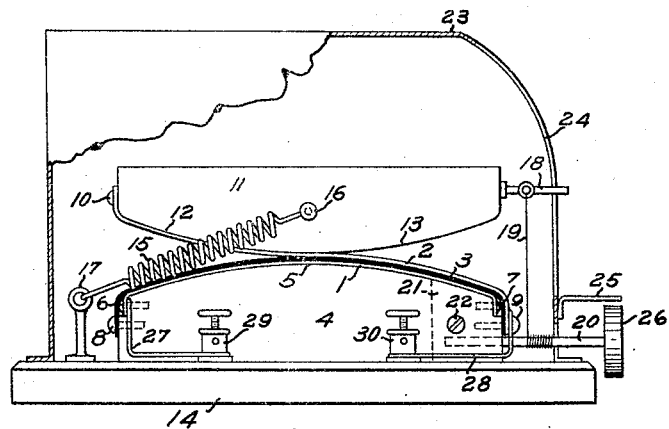

Referring more particularly to Fig. 1, the condenser here shown includes conducting elements 1, 2, separated by insulating material or dielectric 3. The conducting element 1 is here shown as a piece of sheet metal mounted on an insulating member or block 4 having a curved surface 5, but said conducting element might, for example, be formed directly on said curved surface. If made of sheet metal, element 1 may be fastened at its ends to block 4 as by screws or tacks 6, 7. The insulating material 3 may be in the form of a suitable sheet of desired thickness fastened at its ends to block 4, as by means 8, 9, or it may be in the form of insulating varnish covering the element 1. The fastening means 9 is here shown as also serving to fasten one end of the conducting element 2, which is made of flexible metal to block 4. In the position shown in Fig. 1 the conducting element 1 is in close mechanical contact with the free surface of insulating material 3 for about one half of its length the remainder being flexed over the portion 12 of the curved surface 13 of an insulating member or block 11. Means 10 is provided for fastening the element 2 to block 11.

The block 4 may be mounted on or integral with a base 14. A base portion as such is however not essential.

In order that the flexible conducting element 2 may be better brought into close contact with the insulating material 3 in its various positions of adjustment, biasing means 15, here shown as a helical spring fastened at one end to a pin 16 carried by block 11 and at the other end to a standard 17 carried by base 14, may be provided. If no base 14 is provided, spring 15 may be fastened to block 4, for example, it being understood that the biasing means may be constructed and disposed in any suitable manner.

Figure 3:
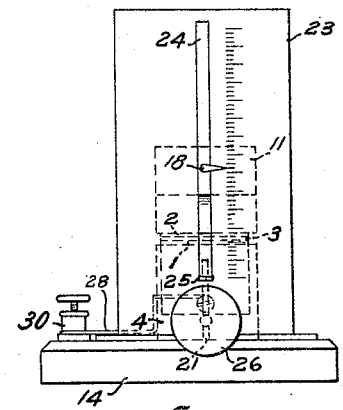
Fig. 3 is an end elevation of the condenser shown in Fig. 1.

In order to restrain the biasing means, a flexible member, as a cord 19, may be fastened to block 11 or to a pin 18 mounted thereon. The other end of the cord 19 is adapted to be wound onto a shaft 20 journaled and frictionally held in a hole in the block. If desired, a slot 21 passing through said hole, may be provided, whereby, by adjusting a screw 22, the shaft 20 may be clamped with any desired degree of pressure. The pin 18 or other means associated with block 11, may serve as means for indicating the position of said block. The pin 18 is here shown as passing through a slot 24 in a housing 23 which may be provided for the condenser if desired. In this case the housing itself may serve to bear a scale for indicating the position of the block 11, as shown in Fig. 3. The shaft 20 is provided with a thumb wheel 26 whereby the cord 19 may be wound and unwound from said shaft. A pointer 25 may be provided to cooperate with graduations on the thumb wheel 26, to indicate the fractions of a turn that have been made by said wheel.

The condenser is shown as provided with stationary terminal conductors 27, 28 connected respectively to conducting elements 1, 2. The conductors may be connected to binding posts 29, 30 respectively.

The operation of the device is as follows. Assuming the condenser to be connected in a circuit and it is desired to increase the capacity, the thumb wheel 26 is turned in the proper direction to permit the cord 19 to unwind from shaft 20. The spring 15 will cause block 11 to roll in a counterclockwise direction as viewed in Fig. 1, thus flexing more of the conducting element 2 onto the surface of insulating material 3, thereby increasing the capacity of the condenser, which, as is well known to those skilled in the art, varies with, among other things, the effective area of the juxtaposed conducting elements and the distance between them. The spring 15 is preferably disposed so that there is a resultant force tending to roll the block 11 to a position of maximum capacity and also a component whereby the flexible element 2 is stretched into intimate contact with the insulating material 3. The latter is desirable so that there will be no air pockets between the conducting elements and the material 3; and the distance between said elements will be uniform. By rotating the thumb wheel 26 in a direction to wind up the cord 19, the capacity may be correspondingly decreased.

It will be noted that for equal angular movements of the block 11 the capacity will be increased, or decreased as the case may be, substantially equal amounts throughout the whole range of capacity, from its minimum to maximum values. At the same time, although relative movement occurs between the conducting elements, flexible leads thereto, or sliding contacts and the like may be entirely eliminated, which is among the features contributing to a simple and efficient construction and resulting low cost of manufacture. In addition to embodying the desirable features hereinabove noted, the construction also lends itself to the use of very thin dielectrics other than air, whereby, by reason of the short distance between the conducting elements, and the possibility of the use of dielectrics of high specific inductive capacity, very large capacities may be obtained for a given effective area of the conducting elements. Various sizes of condensers may be produced by merely selecting the desired area for the conducting elements, the manufacturing cost remaining substantially the same as no special dies are necessary and the number of conducting elements is the same for a large condenser as for a small one.

In order to preserve the resilience of the spring 15, it is preferable to so mount it that rocking of the block during the usual adjustments will not substantially change the strain in said spring. One way in which this may be accomplished is to apply the force of the spring at about the center of the block 11 as shown in Fig. 1. The spring being directed to about the virtual center about which the point 16 rotates when the block is rocked. By maintaining the strain in spring 15 substantially constant, the force necessary to rotate the thumb wheel 26 will not change materially.

It will of course be understood that there may be another spring similar to 15 applied to the other side of the block 11, or that a single spring may be used and any suitable means added, whereby its biasing force may be applied to both sides of the block 11.

It will be clear that as far as certain features of my invention are concerned, the block 11 might be made stationary and the block 4 caused to roll on the block 11. In this case the shaft 20 and pin 18 would preferably also be reversed in position.

Figure 2:
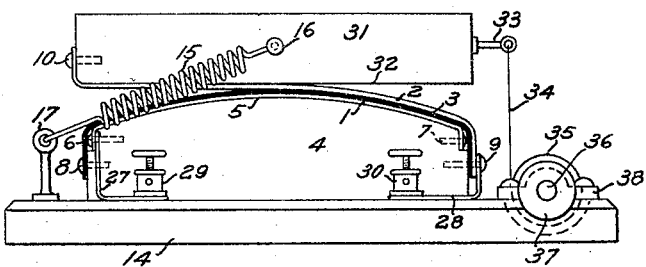
Fig. 2 is a side elevation of a condenser of a form differing from that shown in Fig. 1, also embodying the invention.

Fig. 2 illustrates another embodiment of the invention, wherein like reference numerals indicate parts similar to those in Fig. 1. The insulating member 11 of Fig. 1 has however been replaced by an insulating member 31 having a plane surface 32 instead of a curved surface. One end of a flexible member or cord 34 is shown as attached to block 31 through pin 33 carried by said block. The other end of the cord 34 is adapted to be wound onto a drum 35 mounted on a shaft 36 suitably held by a bearing block 38. The shaft and drum may be rotated by a thumb wheel 37. The drum 35 may be made of such diameter that one revolution thereof will move the block 31 from one limiting position to the other. The operation of the condenser in Fig. 2 is obvious from the description in connection with Fig. 1.

It is obvious that various modifications and embodiments within the spirit and scope of my invention will occur to those skilled in the art and I aim to cover these in the claims.

What I claim as new and desire to secure by Letters Patent of the United States is:

1. In an electrical condenser, a pair of conducting elements separated by insulating material, and means whereby the capacity of said condenser may be varied including a pair of members one of which is arranged to roll upon the other, said conducting elements being interposed between said members.

2. In an electrical condenser, a curved conducting surface, a flexible sheet of conducting material, means whereby said sheet may be flexed about said surface, insulating material separating said surface and said sheet, and stationary terminals rigidly connected to said surface and said sheet respectively.

3. In an electrical condenser, a pair of insulating members one of which has a curved surface, a sheet of conducting material mounted on and in contact with the surface of one of said members, a flexible sheet of conducting material fastened at its ends to said insulating members respectively, a sheet of insulating material for separating said sheets of conducting material, said insulating members being mounted to be rollable upon each other with said sheets of conducting and insulating material therebetween.

4. In an electrical condenser, a pair of relatively movable conducting elements separated by insulating material, terminals connected to said elements respectively, at least one of which terminals is stationary and rigidly connected to one of said elements, and means whereby the capacity of said condenser may be increased or decreased between its minimum and maximum values by substantially equal amounts for equal amounts of relative movement.

5. In an electrical condenser, a pair of relatively movable conducting elements separated by insulating material, stationary terminals rigidly connected to said elements respectively, and means whereby the capacity of said condenser may be increased or decreased between its minimum and maximum values by substantially equal amounts for equal amounts of relative movement.

6. In an electrical condenser, an insulating member having a curved surface, a sheet of conducting material mounted on and in contact with said surface, a sheet of insulating material covering said conducting sheet, a second insulating member having a curved surface, a flexible sheet of conducting material fastened at one end to said first insulating member and at the other end to said second insulating member, said second member and said flexible sheet being mounted to be rollable upon said sheet of insulating material to vary the capacity of said condenser.

7. In an electrical condenser, an insulating member having a curved surface, a sheet of conducting material mounted on and in contact with said surface, a sheet of insulating material covering said conducting sheet, a second insulating member having a curved surface, a flexible sheet of conducting material fastened at one end to said first insulating member and at the other end to said second insulating member, means for biasing said second insulating member to roll said flexible sheet into engagement with said sheet of insulating material, and means for overcoming said bias and stopping said second member in any desired position within its rolling range.

8. In an electrical condenser, a pair of insulating members one of which has a curved surface, a sheet of conducting material mounted on and in contact with the surface of one of said members, a sheet of insulating material covering said conducting sheet, a flexible sheet of conducting material fastened at its ends to said insulating members respectively, whereby one of said members and said flexible sheet may be rolled upon said sheet of insulating material to vary the capacity of said condenser, means for biasing said flexible sheet to a position of maximum capacity, and means for adjusting and indicating the position of said flexible sheet including a flexible member attached to one of said insulating members and a rotatable member upon which said flexible member is adapted to be wound.

9. In an electrical condenser, a pair of relatively movable conducting elements separated by insulating material, means whereby one of said elements may be flexed around the other element to vary the capacity of said condenser, and adjusting means including means for biasing said flexible element to a position of maximum capacity and for causing substantially the same strain in said biasing means throughout the range of adjustment.

10. In an electrical condenser, a pair of conducting elements insulated from each other, means for causing relative movement of said elements to vary the capacity, and means for making electrical connection to said elements including rigid continuous conductors only.

11. In an electrical condenser, a pair of conducting elements insulated from each other, one of said elements being stationary, means for causing the other element to move relatively to said stationary element to vary the capacity, and means for making electrical connection to said other element including rigid continuous conductors only.

12. In an electrical condenser, a stationary member having a conducting surface, a relatively movable member including a conducting element insulated from said conducting surface, one of said members having a curved surface, said relatively movable member being mounted to be rollable upon said relatively stationary member to vary the capacity.

In testimony whereof, I have hereunto set my hand.

OTTO GRUENBERGER.